Figure 1:
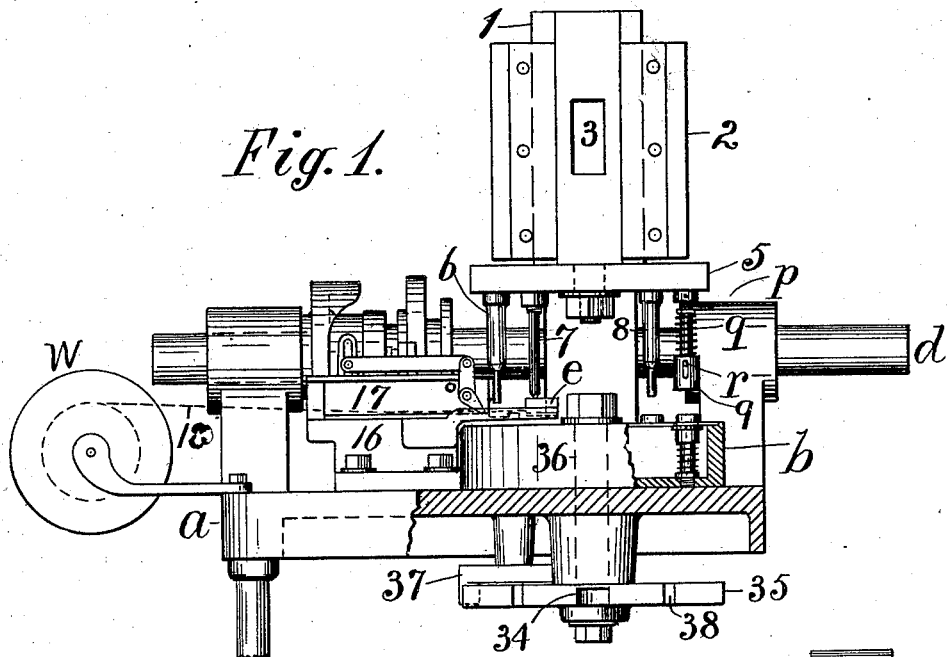

No. 669,997. Patented Mar. 19, 1901.
F. W. LUDINGTON.
MACHINE FOR MAKING TUFT MOLDS OR BUTTONS.
(Application filed May 11, 1900.)
(No Model.) 5 Sheets—Sheet 1.

Attest:
L. Lee.
Walter H. Talmage.

Inventor.
Frederick W. Ludington,
per Thomas S. Crane, Atty.

No. 669,997. Patented Mar. 19, 1901.
F. W. LUDINGTON.
MACHINE FOR MAKING TUFT MOLDS OR BUTTONS.
(Application filed May 11, 1900.)
(No Model.) 5 Sheets—Sheet 2.
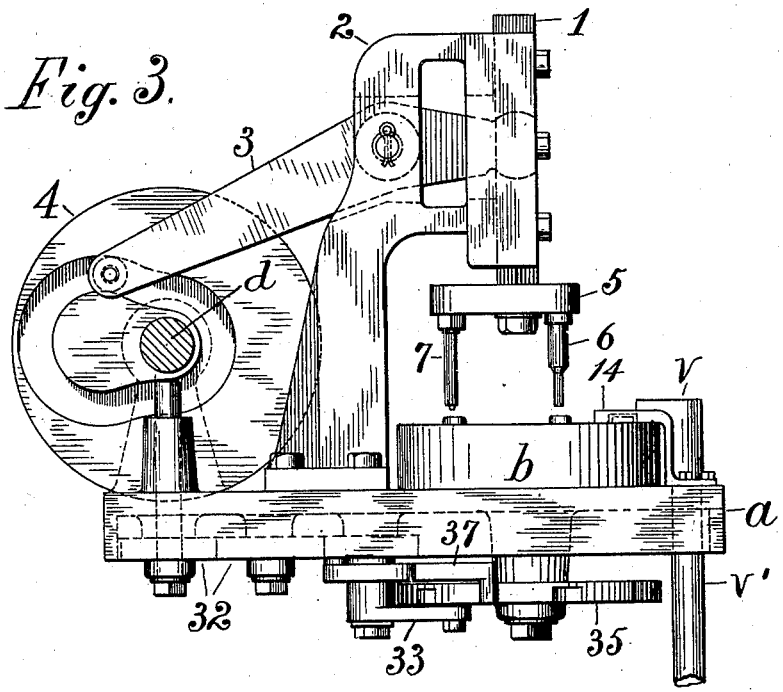
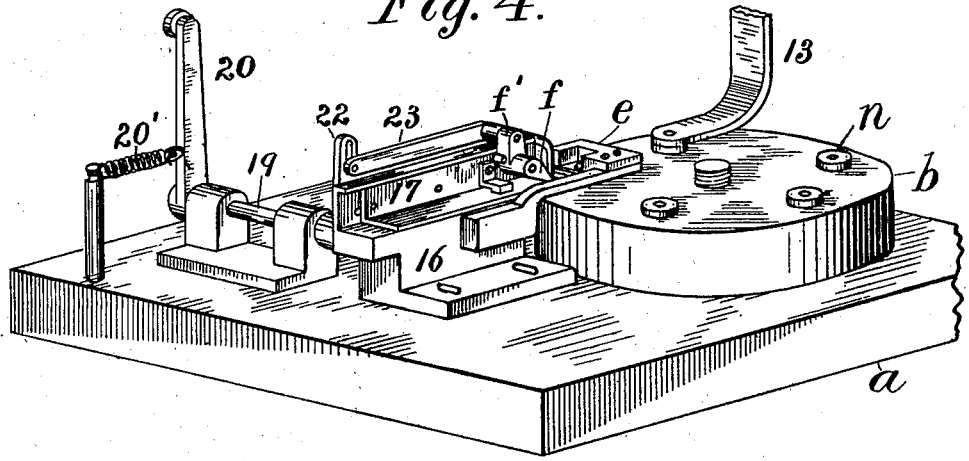
Attest:
L. Lee,
Walter H. Talmage.
Inventor.
Frederick W. Ludington,
per Thomas S. Crane, Atty.

No. 669,997. Patented Mar. 19, 1901.
F. W. LUDINGTON.
MACHINE FOR MAKING TUFT MOLDS OR BUTTONS.
(Application filed May 11, 1900.)
(No Model.) 5 Sheets—Sheet 3.
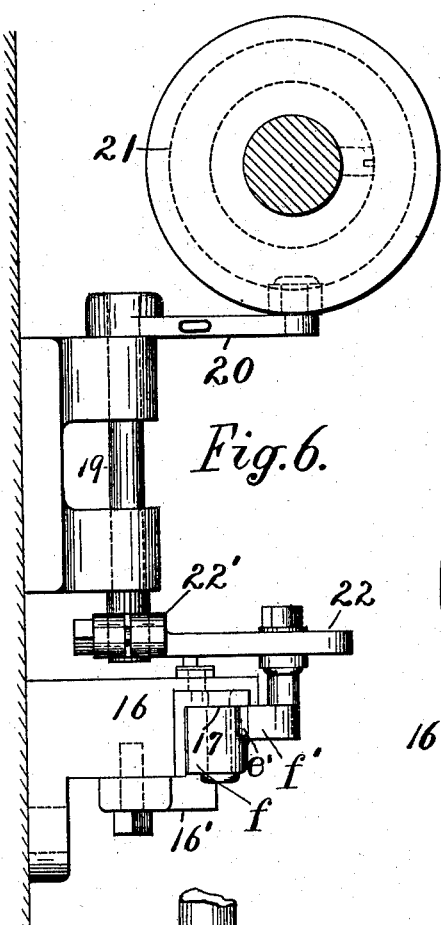
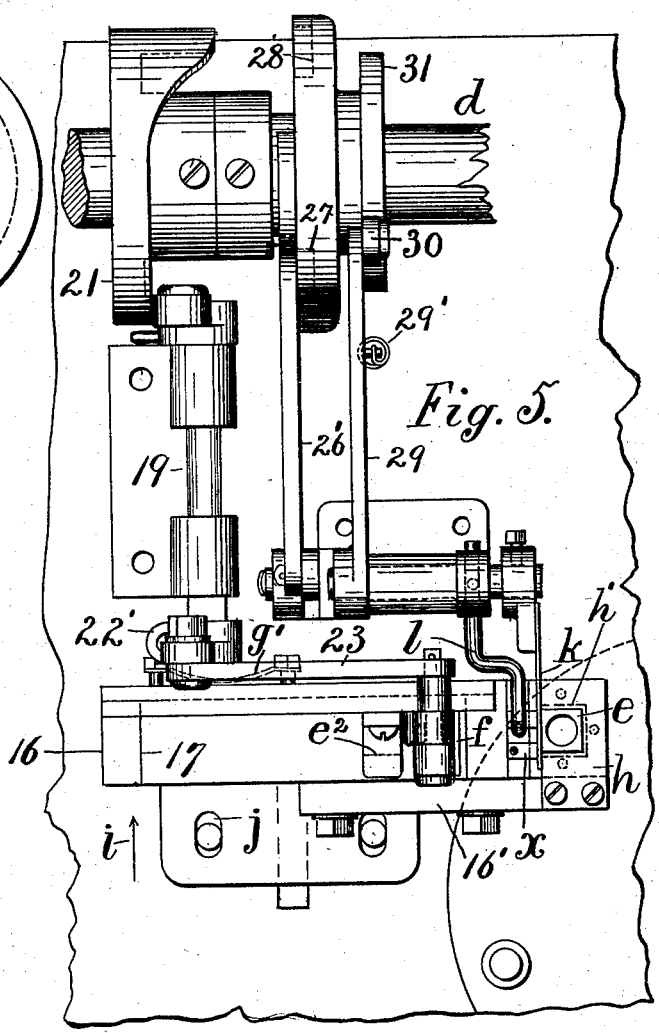
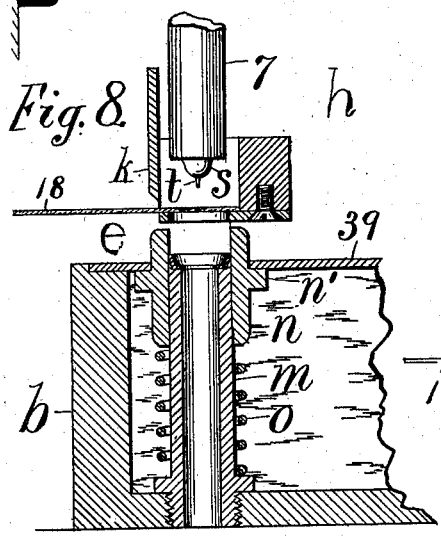
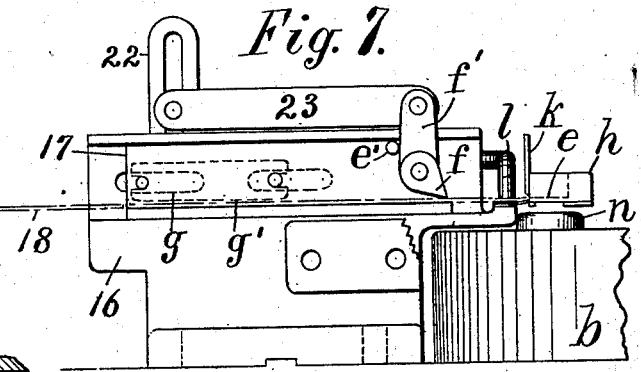
Attest:
L. Lee.
Walter H. Talmage.
Inventor.
Frederick W. Ludington,
per Thomas S. Crane, Atty.

No. 669,997. Patented Mar. 19, 1901.
F. W. LUDINGTON.
MACHINE FOR MAKING TUFT MOLDS OR BUTTONS.
(Application filed May 11, 1900.)
(No Model.) 5 Sheets—Sheet 4.
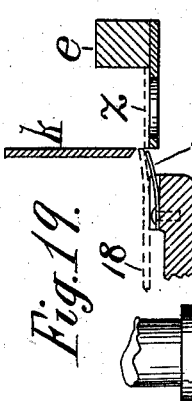
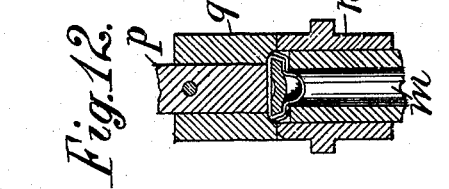
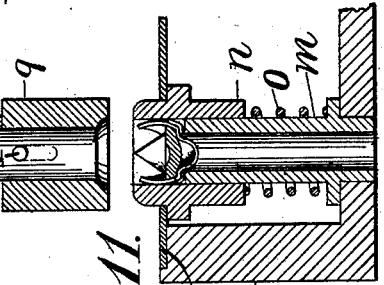
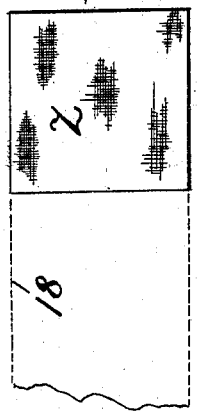
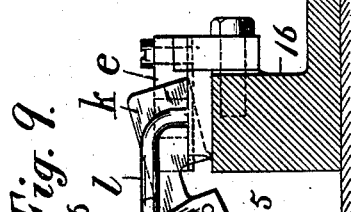
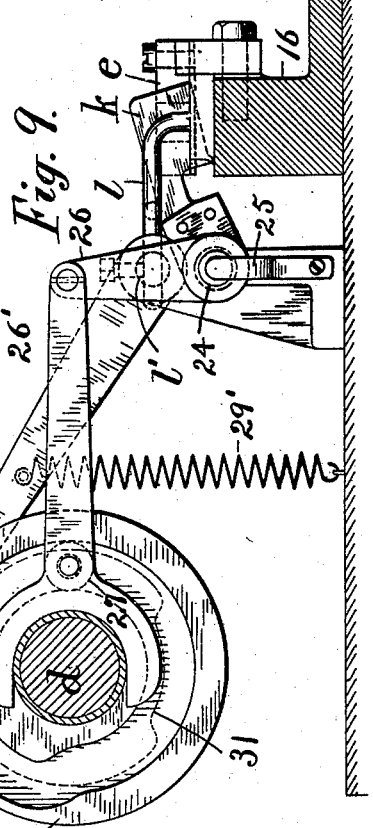
Witnesses: L. Lee, Walter H. Talmage.
Inventor. Frederick W. Ludington, per Thomas S. Crane, Atty.
THE NORRIS PETERS CO., PHOTO-LITHO., WASHINGTON, D. C.

No. 669,997. Patented Mar. 19, 1901.
F. W. LUDINGTON.
MACHINE FOR MAKING TUFT MOLDS OR BUTTONS.
(Application filed May 11, 1900.)
(No Model.) 5 Sheets—Sheet 5.

Attest:
L. Lee,
Walter H. Talmage.

Inventor.
Frederick W. Ludington,
per Thomas S. Crane, Atty.

UNITED STATES PATENT OFFICE.

FREDERICK W. LUDINGTON, OF WATERBURY, CONNECTICUT, ASSIGNOR TO THE L. C. WHITE CO., OF SAME PLACE.

MACHINE FOR MAKING TUFT-MOLDS OR BUTTONS.

SPECIFICATION forming part of Letters Patent No. 669,997, dated March 19, 1901.

Application filed May 11, 1900. Serial No. 16,339. (No model.)

*To all whom it may concern:*

Be it known that I, FREDERICK W. LUDINGTON, a citizen of the United States, whose residence and post-office address is 461 North Main street, Waterbury, New Haven county, State of Connecticut, have invented certain new and useful Improvements in Machines for Making Tuft-Molds or Buttons, fully described and represented in the following specification and the accompanying drawings, forming a part of the same.

The present invention relates to an improved machine in which a cloth blank may be fed to a die and assembled with metallic shells forming the front and back of a button and the whole secured together to form a tuft-mold or complete button. The present machine is of that class in which a number of dies are fixed upon a dial-plate and the dies shifted into positions in which successively each die receives the front or rear shell of a button, the fabric blank is forced into the die, the opposite part of the button placed in the die, and the whole pressed together, with the edges of the fabric turned inwardly. The machine may be used for making wire-eye buttons or tuft-molds, the back in one case being provided with a wire eye and in the other formed as an annular collet.

The invention provides for the use of rectangular blanks for the fabric covering cut from the end of a ribbon in the machine upon a seat sustained over the path of the dies.

The invention is illustrated in connection with a tuft-mold machine which is constructed with a dial-plate carrying a series of dies and includes means for feeding the collets successively to the dies and for pressing the blanks for the fabric coverings into the collets and for then forcing a wad within the covering and folding the corners of the covering upon the flat surface of the wad. The wad and collet, provided with a tuft, form a tuft-mold which is an article of manufacture and sale and is made up in connection with shells and front coverings of various kinds to form upholsterers' tufting-buttons. The feeding devices shown in the drawings are adapted for use with ribbons of different widths and are adjustable to feed the center of the ribbon over the center of the die. In practice I provide a recessed seat above the die, with one side of the recess open to receive the end of the ribbon, and form a circular aperture through the seat, by which the corners of the blank are turned upwardly when a punch forces the blank through the seat into the die. The bottom of the seat is formed of a thin plate of steel, and a shear-blade is arranged to move in contact with the edge of the seat, so as to sever the blank from the ribbon when the end of the ribbon is fed into the seat. The machine is illustrated with a punch-slide carrying the tools adapted to coöperate with the dies in their successive positions; but the means for feeding the collets and wads to the dies are only illustrated diagrammatically, as their nature and operation are fully known and form no part of the present invention.

Figure 2:
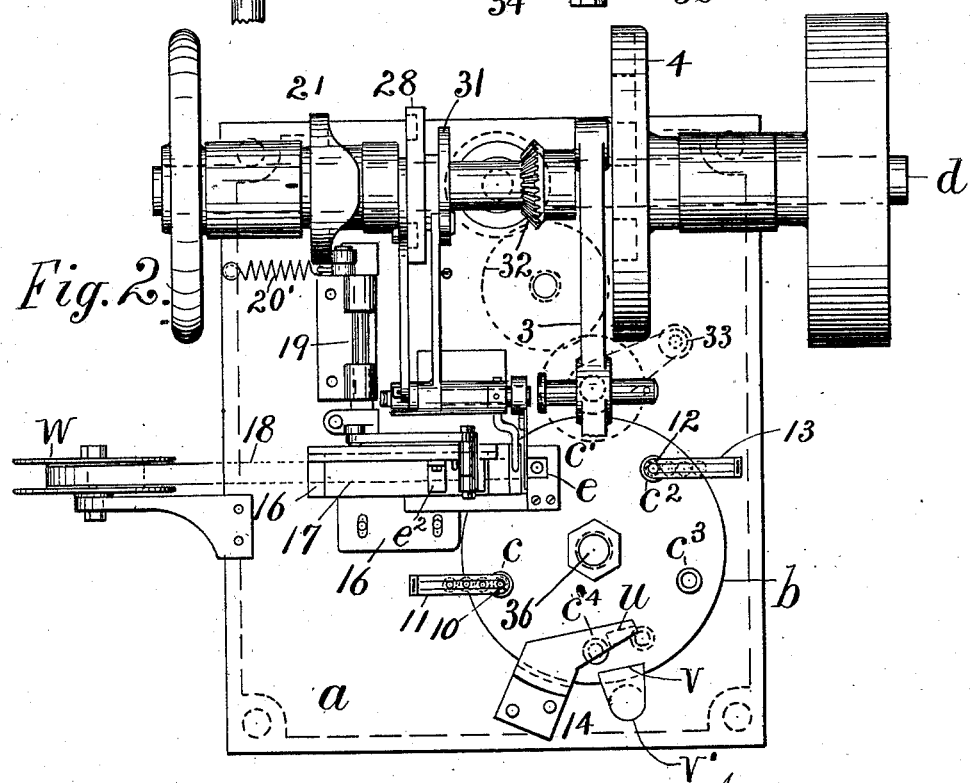
Figure 20:
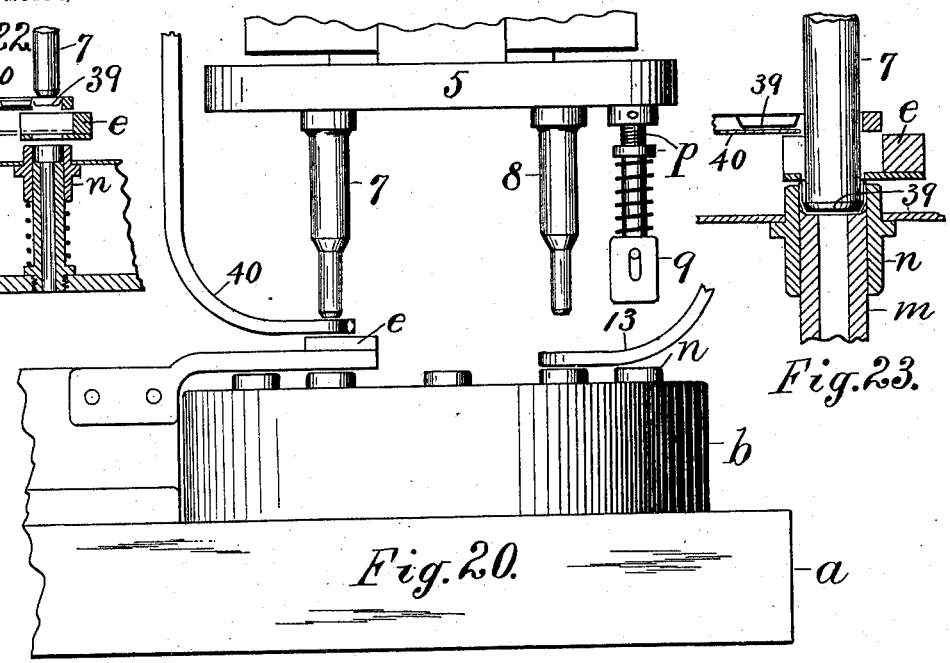
Figure 22:
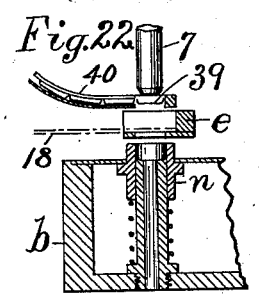
Figure 23:
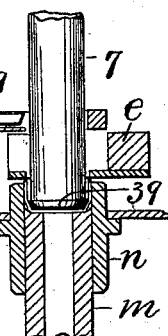
Figure 21:
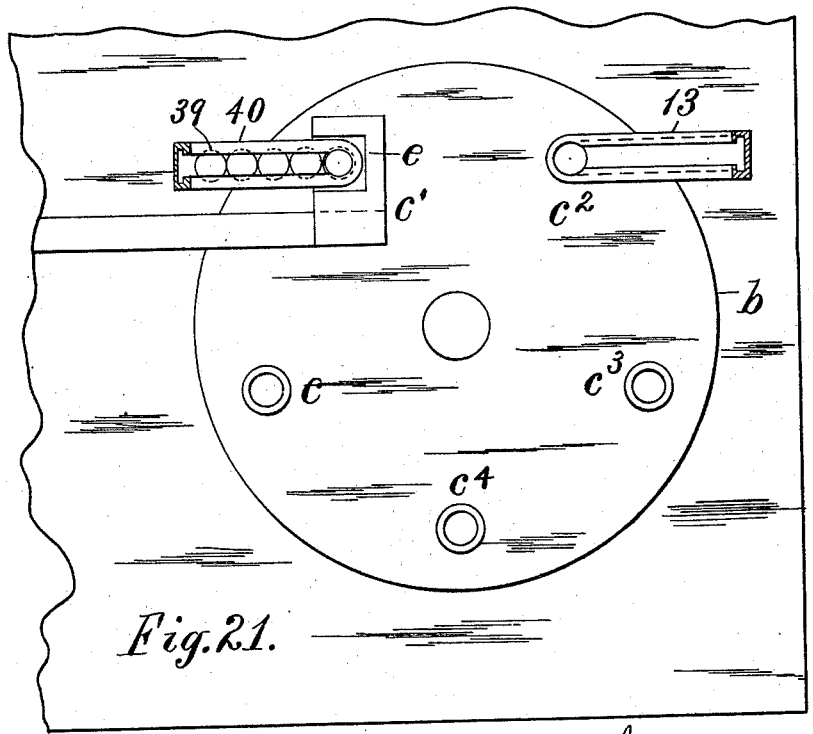

In the drawings, Figure 1 is a front elevation of the machine with a portion in vertical section where hatched, the gearing connecting the cam-shaft with the ratchet-wheel of the dial-plate being omitted. Fig. 2 is a plan of the machine without the standard. Fig. 3 is a side elevation of the machine. Fig. 4 is a perspective view of the dial-plate and feeding appliances. Fig. 5 is a plan enlarged of the feeding and shearing appliances. Fig. 6 is a side elevation of the feeding appliances; Fig. 7, a front elevation of the parts shown in Fig. 5; Fig. 8, a vertical section of the seat and the die for receiving the blank therefrom. Fig. 9 is a side elevation of the shearing device; Fig. 10, the punch for folding the corners of the blank upon the wad in the die; Fig. 11, the die containing the wad, collet, and blank; Fig. 12, the adjacent parts of the punch and die with the corners of the blank folded upon the wad. Fig. 13 is a plan, and Fig. 14 a section, of the collet. Figs. 15 and 16 are a plan and edge view of the wad; Fig. 17, a plan of the blank with the adjacent ribbon shown in dotted lines, and Fig. 18 is a perspective view of the completed tuft-mold. Fig. 19 is a vertical section of the seat *e* and adjacent part of the bed. Fig. 20 is an elevation, and Fig. 21 a plan, of the parts arranged for making complete buttons. Fig. 22 is a section of the parts, including the chute, adjacent to the seat for the square blank with the punch in readiness to force a shell, with the blank, into the die. Fig. 23 shows the die and the adjacent parts upon a larger scale with the shell and blank forced into the die.

*a* designates the base-frame, carrying the horizontal dial-plate *b*, containing five dies of the character shown in Figs. 8 and 11, one of the dies being exposed in Fig. 1 within the dial-plate.

*d* is a driving-shaft sustained in bearings at the rear of the base-frame, with the driving-pulley upon one end.

1 is a punch-slide mounted in a standard 2 and actuated by lever 3 and a cam 4 upon the driving-shaft.

5 is a punch-holder carrying the tools 6 7 8 9 for coöperating with the dies in four positions, the finished product being discharged from the die in transit to the final position.

When the machine is used for making tuft-molds, the die (when in the position marked *c* in Fig. 2) receives a collet 10 from a chute 11, and the intermittent rotation of the dial brings the die, with such collet, into the position $c'$ beneath the seat *e*, containing the square blank *z*, of fabric. After receiving the blank the die is moved to the position $c^2$, where it receives the wad 12 from a chute 13, then to the position $c^3$, where the corners of the blank are turned down upon the wad, and then to the position $c^4$. The finished tuft-mold is discharged from the die by the inclined cam 14 in its transit to the fifth position $c^4$.

When the machine is used for making complete buttons, the front shell, as shown in Fig. 22, is fed to the seat *e* by chute 40 above the square blank, and the shell and blank are forced into the die together, as shown in Fig. 23. The other half of the shell is supplied to the die by the chute 13 and forced upon the front shell in the die $c^2$. The two parts of the button are closed or secured together in the position $c^3$ and the finished product discharged in transit to the position $c^4$.

The ribbon 18 to form the square blanks is supported by a reciprocating feed-slide 17, Figs. 2 to 5, upon a feed-bed 16, in line with the seat *e*, and such slide carries a pivoted dog *f*, adapted to bite the ribbon 18 when tipped toward the same. The ribbon is fed to the slide from a spool *w*. The seat *e* is surrounded upon three sides by a frame *h*, forming walls, which inclose a recess into which the end of the ribbon is fed, and a guide $e^2$ is shown in Figs. 2 and 5 upon the slide 17 to hold the ribbon in line with the recess of the seat as the ribbon is fed forwardly. Such guide is formed with a passage upon the under side of the same width as the ribbon and would necessarily be changed to operate with a ribbon of greater or less width. Studs from the feed-slide project through slots *g* at the rear of the bed and grasp the ends of a spring $g'$, which presses upon the outer side of the bed and produces a frictional resistance to the movement of the slide. A shaft 19, journaled in the rear of the feed-bed, is oscillated by a crank 20 and cam 21 and has a slotted arm 22, connected by link 23 with an arm $f'$ upon the upper end of the dog *f*. A spring $20'$, attached to the arm 20, (see Fig. 2,) serves to normally retract the slide 17. A pin $e'$ upon the feed-slide permits a slight backward movement of the arm $f'$ when the link 23 is moved backwardly to release the ribbon, and the motion of the link thereafter operates to draw the slide backward, while the forward motion of the link under the resistance of the spring $g'$ first tips the dog against the ribbon and then draws the slide 17 forward to feed the ribbon into the recess of the seat *e*. A shear-blade *k* severs the ribbon at the edge of the seat, and springs *x* are sunk in a projection at the end of the bed 16, as shown in Figs. 5 and 19, to lift the end of the ribbon after it is pressed downward by each movement of the shear-blade. By cutting the ribbon against the edge of the seat I avoid curling or twisting the severed portion which forms the square blank, as the blank is supported upon the flat surface of the seat, while the body of the ribbon is pushed downward obliquely by the descent of the shear-blade. The pressing downward of the ribbon necessitates the springs *x* or analogous means to lift the end of the ribbon again above the level of the seat, so that when the ribbon is fed forwardly it may enter the recess of the seat within the frame *h*. (See Fig. 19.) The plate in the bottom of the recess is formed with central aperture and is secured by means of screws to be readily detachable, and the frame *h*, surrounding the seat, is secured detachably upon an arm $16'$, bolted to the bed 16, so that seats of different dimensions may be applied to the feeding device to form blanks of different sizes with ribbons of different widths. A narrow ribbon is indicated by the dotted lines 18 in Fig. 5, and to use a wider ribbon and bring the center of the same over the die (whose position is unchanging) the feeding-bed 16 is movable laterally in the direction of the arrow *i*, which is permitted by means of the bolting-slots *j* in the foot of the bed. The slotted arm 22 is adjustable at the same time upon the end of the shaft 19 by a split clamping-hub $22'$, Figs. 5 and 6. The frame for a larger seat is indicated by the dotted lines $h'$ in Fig. 5, which would be secured upon the arm $16'$ and the latter moved a little to the left, as required. A shear-blade *k* is mounted upon a shaft 24 to move past the outer edge of the seat, and a spring 25, Fig. 9, is arranged in contact with the farther end of the shaft to press the blade constantly toward the seat. The shaft is oscillated by an arm 26 and a link $26'$, carrying a roll 27, which is fitted to a cam 28 upon the shaft *d*. To hold the ribbon from retraction when the feed-slide is drawn backwardly by the link 23, a clamping-finger *l* is arranged to press upon the bed adjacent to the seat $e$ and is actuated by a shaft $l'$ and lever-arm 29, carrying a roll 30, in contact with a cam 31 upon the shaft $d$. A spring 29' overbalances the finger $l$ and lifts the same, when the roll 30 falls into a notch upon the cam 31. Fig. 9 shows the finger pressed upon the ribbon and the shears moved downward to sever it. The slot in the arm 22 varies the throw of the link 23 to give the required movement to the ribbon, and when the latter is carried into the seat $e$ the clamping-cam 31 presses the finger $l$ upon the ribbon and holds it while the shear-blade is operated by the cam 28 and the feeding-slide and while the dog $f'$ is retracted by the link 23.

Any ordinary mechanism may be used for intermittently rotating the dial-plate as is common in button-machines, Figs. 1 and 2 showing a train of gears 32 for rotating a crank 33 into radial slots 34 upon a feed-wheel 35, which is arranged under the base-frame $a$ and connected with the dial-plate by spindle 36. A pawl 37 is shown to fit in notches 38 in the dial-plate, and the crank and pawl would be actuated in the ordinary manner to turn the dies into the successive positions $c$ to $c^4$, inclusive.

The die-post $m$ is provided, as shown in Figs. 8 and 11, with a sleeve $n$, fitted about the top of the same and sustained elastically by spring $o$. The dies are fixed equidistant within the dial-plate, and a cover 39 upon the top of the dial-plate is provided to hold the sleeves $n$ at a fixed level by contact with flanges $n'$ upon the sleeves. The tops of the posts and the cover are substantially in a line, so that when the sleeves are depressed the tuft-molds or buttons may be swept laterally from the top of the post while the dial-plate is rotating, as hereinafter described. The punches for making tuft-molds consist of a straight punch 6 to force the collets from the chute 11 into the die, which places the collet upon the top of the post within the sleeve, as shown in Fig. 8, in readiness to receive the fabric blank. The punch 7 to feed the fabric into the collet is provided, as shown in Fig. 8, with a boss $s$ to form the tuft and a needle-point $t$ upon the end of the boss to penetrate the fabric and hold it central while the punch carries it through the aperture in the bottom of the seat $e$. A punch 8 is employed to transfer the wads 12 from the chute 13 into the die, which inserts it within the tufted fabric, as shown in Fig. 9, with the corners of the blank projecting upwardly around the edges of the wad. The punch to turn the corners of the blank inwardly upon the upper side of the wad is shown in Fig. 10 and consists of the stem $p$, having the sleeve 9 upon its lower end sustained elastically by spring $q$. The sleeve is retained upon the stem by pin $r$, and the inner corner of the sleeve, at the bottom, is beveled to turn the corners of the blank inwardly. The operation of this punch with the die is shown in Fig. 12, the spring $p$ being made much stronger than the spring $o$, so that the sleeve $n$ is forced downwardly while the sleeve 9 turns the corners of the blank inwardly; but when the upper sleeve contacts with the corner of the collet, as shown in Fig. 12, the punch-stem $p$ moves downwardly through the sleeve 9 and presses the corners of the fabric close upon the wad. The tuft-mold is thus finished and is discharged by the cam 14, which has a downwardly-inclined face $u$ to press the sleeve $n$ downwardly to expose the tuft-mold and a face set obliquely to the movement of the dies, so as to force the tuft-mold laterally from the top of the post in its movement to the position $c^4$.

Figs. 20 to 23, inclusive, show the arrangement of the parts for making finished buttons, a chute 40 being arranged above the seat $e$ to deliver the front shell 39 of the button thereto. In practice the chute is arranged with jaws to retain the shell until forced downward by the punch. The descent of the punch 7 thus carries the shell downward upon the blank and forces it, with the blank, into the die, as shown in Fig. 23. The chute 13 serves to feed the back shell of the button into the die in the position $c^2$, so that the two parts may be closed together in the position $c^3$ and the finished button discharged in transit to the position $c^4$. A funnel $v$ is shown in Fig. 2 held adjacent to the margin of the dial-plate to receive the tuft-molds or buttons as they are discharged, with tube $v'$ to lead them into a receptacle. It will be observed that this means for discharging the finished button or tuft-mold from the die differs from all others in that the article is discharged from the die while the die is in motion or in transit from the position in which the button or tuft-mold was finished. In such an operation the cam or agent which pushes the finished article from the die may be stationary, as in the case of the cam 14, (see Fig. 2,) and the discharge of the button is thus effected by the sliding of the latter upon the inclined surface of the cam, which presses the button laterally from the die toward the receiving-funnel $v$. Such a construction obviates the necessity of any moving mechanism to remove the button from the die, but makes the cam entirely self-acting. The proper operation of the cam to throw the button from the die to the funnel $v$ implies a suitable rapidity of movement in the button during its transit past the cam to impel it to the funnel after it has left the die, which gives it its initial momentum. It also implies a movement in some part of the die to release the button from the lateral walls of the die, so that it may be pushed laterally by the cam. The movement which frees the button from the die is effected in the construction shown by the depression of the sleeve $n$ by the downwardly-inclined face $u$ of the cam. In the present drawings the tuft-mold or button is finished in the position designated $c^3$, and it is in the movement from $c^3$ to $c^4$ that the button-mold is discharged; but in the making of a button or button-mold that required any additional operation the article would be finished in the position designated $c^4$ and discharged in its movement to the position designated $c$.

From the above description it will be seen that my machine differs in various respects from other machines which have been devised for automatically assembling the parts of a tuft-mold or button, especially in the provision of a stationary seat above the path of the dies to receive the end of a ribbon and support the same while a blank is cut therefrom. Such seat obviates the twisting and distortion of the blank when cut from the ribbon, while the walls of the seat formed by the frame $h$ serve to hold it exactly central over the die when the die is moved thereunder. To prevent the blank from drawing unequally through the aperture in the seat, I provide the sharp needle-point $t$ upon the punch, which carries the blank downwardly into the die, and the blank is thus held central and delivered within the die, with the corners projecting upward equally, as is shown in Fig. 11 and as is required to fold them equally over the wad, as shown in Fig. 18. I have made specific claims to the devices which I employ for cutting the fabric blanks from the end of a ribbon; but the general construction and arrangement of the machine is independent of the devices for thus forming the blanks, and the other features of the machine may therefore be used with round blanks placed in the dies by any means whatever.

Having thus set forth the nature of the invention, what is claimed herein is—

1. In a machine for making buttons or tuft-molds, the combination, with a moving dial-plate and the die carried thereby for receiving the fabric blank, of a seat sustained above the path of the die, to support a fabric blank, and provided with an aperture for passing the blank downward to the die, substantially as herein set forth.

2. In a machine for making buttons or tuft-molds, the combination, with a moving dial-plate and the die carried thereby for receiving the fabric blank, of a recessed or walled seat arranged above the path of the die for receiving a square blank, means for feeding the end of a ribbon into the recess of such seat, and means for cutting off the ribbon while inclosed by the walls of the seat to form such square blank, substantially as herein set forth.

3. In a machine for making buttons or tuft-molds, the combination, with a moving dial-plate and the die carried thereby for receiving the fabric blank, of a recessed or walled seat arranged above the path of such die with central aperture to permit the passage of the blank into the die, means for feeding the end of a ribbon into such walled seat over the aperture, means for cutting off the ribbon while inclosed by the walls of the seat to form such square blank, and a punch to force the blank through such aperture into the die.

4. In a machine for making buttons or tuft-molds, the combination, with a dial-plate and the die carried thereby for receiving the fabric blank, of a recessed or walled seat arranged above such die with central aperture to permit the passage of the blank into the die, means for feeding the end of a ribbon into the recess of the seat over such aperture, and a shear-blade operated to cut against the outer edge of such seat and sever the blank from the ribbon, substantially as herein set forth.

5. In a tuft-mold machine, the combination, with the punch and die for forming the tuft to receive the wad, of a recessed seat, with central aperture, supported above the path of the die, means for feeding a ribbon to the seat, means for severing from the ribbon the portion within the seat, and a punch to force the blank into the die, said punch having a boss to shape the tuft and a central pointed needle to engage the material of the blank during the depressing and shaping of the blank.

6. In a tuft-mold machine, the combination, with a dial-plate having a die for receiving the fabric blank, of a seat sustained above the path of the dies with central aperture to pass the blank into the die, a feeding-slide in line with the seat and a dog carried and moved by the slide for feeding the end of a ribbon into the seat, and a shear-blade operated to cut against the outer edge of such seat to sever the blank from the ribbon.

7. In a tuft-mold machine, the combination, with a horizontal dial-plate having a series of dies, of a seat sustained in the path of the dies with central aperture to pass the covering into the die, a feed-bed sustaining a feeding-slide in line with the seat with a dog for feeding a ribbon into the seat, means for clamping the ribbon upon the end of the bed adjacent to the seat during the retraction of the dog, and a shears to sever the blank from the ribbon.

8. In a tuft-mold machine, the combination, with a base-frame carrying a horizontal dial-plate having a series of dies, of bearings sustaining a driving-shaft at one side of such dial-plate, a recessed seat sustained above the path of the dies with central aperture to pass the fabric blank into the die, a feeding-slide in line with the seat with means for feeding a ribbon into the seat, a shear-blade operated to cut against the outer edge of such seat, and cams upon the driving-shaft with connections to operate the feeding device and the shear-blade.

9. In a tuft-mold machine, the combination, with a horizontal dial-plate having a series of dies, of a recessed seat sustained above the path of the dies, a punch to force a collet into the die in its first position, before it is moved under the seat, a feeding device adapted to feed the end of a ribbon into such seat, means to sever a square blank from the end of the ribbon, a punch to force the blank through the seat into the collet, a punch to force a wad into the tufted blank in the third position of the die, a punch to fold the corners of the blank upon the top of the wad in the fourth position of the die, and finally, means for discharging the finished tuft-mold from the die.

10. In a tuft-mold machine, the combination, with a base-frame carrying a horizontal dial-plate having a series of dies, of bearings sustaining a driving-shaft at the rear of such base-frame, a seat sustained in the path of the dies with central aperture to pass the fabric blank into the die, a feed-bed sustaining a feeding-slide in line with the seat and adjustable laterally to such line, a dog pivoted upon the feed-slide, a clamp to press the ribbon upon the bed during the retraction of the dog, a shear-blade operated to cut against the outer edge of such seat, and cams upon the driving-shaft adapted respectively to reciprocate the feed-slide by connection with the dog, to press the clamp upon the bed, and to oscillate the shear-blade against the edge of the seat.

11. In a tuft-mold machine, the combination, with a horizontal dial-plate having a series of dies, of a perforated seat held removably over the path of the dies, a feed-bed sustaining a feeding-slide in line with the seat with a dog for feeding a ribbon into the seat, a spindle with shear-blade to oscillate against the edge of the seat, a spring to press the spindle longitudinally toward the seat, and means for reciprocating the dog, and for oscillating the shear-blade, as and for the purpose set forth.

12. In a tuft-mold or button machine, the combination, with a horizontal dial-plate having a series of dies, of means to feed the button parts successively to the dies, means for pressing the parts of the button together in a final position of the dies, and a stationary cam operating to sweep the finished article laterally from the die while in transit to the succeeding position, substantially as herein set forth.

13. In a tuft-mold or button machine, the combination, with a horizontal dial-plate having a series of dies comprising each a fixed post and a spring-sustained sleeve upon such post, of means to feed the button parts successively to the dies, means for pressing the parts of the button together in a final position of the dies, and the discharge-cam 14 having a downwardly-inclined face and a laterally-inclined face, the former operated to depress the sleeve while in transit past the cam, and the latter operated to then sweep the finished article laterally from the post of the die, substantially as herein set forth.

14. In a tuft-mold or button machine, the combination, with a horizontal dial-plate having a series of dies comprising each a fixed post and a spring-sustained sleeve, and having a cover 39 in line with the tops of the posts, means to feed the button parts successively to the dies, means for pressing the parts together in a given position of the dies, the cam fixed to the bed of the machine and having the downwardly-inclined face $u$ adjacent to the cover to depress the sleeves successively, and the cam having the laterally-inclined face to sweep the finished article from the post of the die, while in transit past the cam, substantially as herein set forth.

15. In a tuft-mold machine, the combination, with a horizontal dial-plate having a series of dies, of a recessed or walled seat sustained in the path of the dies with central aperture to pass the fabric blank into the die, a feeding-slide in line with the seat with a dog for feeding a ribbon into the seat, means for adjusting the feeding-slide laterally for tapes of various widths, and a shear-blade operated against the edge of the seat to sever the blank from the ribbon.

16. In a tuft-mold machine, the combination, with a horizontal dial-plate having a series of dies, of a support for a seat with a seat fixed detachably thereon above the path of the dies with central aperture to pass the blank into the die, a feed-bed sustaining a feeding-slide in line with the seat, with a dog for feeding a ribbon into the seat, and means for adjusting the feeding-slide laterally whereby the seat and the feeding-slide may be adapted to operate with ribbons of various widths.

17. In a tuft-mold machine, the combination, with a dial-plate having a series of dies, of a recessed seat sustained above the path of the dies and provided with a removable and renewable bottom plate having central aperture to pass the covering into the die, means operating in line with the seat for feeding a ribbon into the seat, and a shear-blade operated against the outer edge of such seat to sever the blank from the ribbon.

In testimony whereof I have hereunto set my hand in the presence of two subscribing witnesses.

FREDERICK W. LUDINGTON.

Witnesses:
E. M. ROBERTS,
CHARLES F. DOHERTY.